United States Patent
Matyas et al.

(10) Patent No.: US 11,821,555 B2
(45) Date of Patent: Nov. 21, 2023

(54) HOSE ENDING, MAINLY AS CONNECTING ELEMENT

(71) Applicant: BJV RESEARCH, S.R.O., Bratislava (SK)

(72) Inventors: Tibor Matyas, Mad (HU); Branko Jass, Vtacnikom (SK); Jan Tomas, Bratislava (SK); Valer Kokos, Bratislava (SK); Gabor Janos Bato, Szerencs (HU)

(73) Assignee: BJV RESEARCH, S.R.O., Bratislava (SK)

( * ) Notice: Subject to any disclaimer, the term of this patent is extended or adjusted under 35 U.S.C. 154(b) by 509 days.

(21) Appl. No.: 16/619,221

(22) PCT Filed: Jun. 9, 2018

(86) PCT No.: PCT/IB2018/054185
§ 371 (c)(1),
(2) Date: Dec. 4, 2019

(87) PCT Pub. No.: WO2018/225044
PCT Pub. Date: Dec. 13, 2018

(65) Prior Publication Data
US 2020/0166166 A1    May 28, 2020

(30) Foreign Application Priority Data

Jun. 9, 2017 (SK) .................................. 50056-2017
Jun. 7, 2018 (SK) .................................. 50058-2018

(51) Int. Cl.
*F16L 33/02* (2006.01)
*F16L 33/00* (2006.01)
(Continued)

(52) U.S. Cl.
CPC .............. *F16L 33/24* (2013.01); *F16L 33/003* (2013.01); *F16L 33/18* (2013.01)

(58) Field of Classification Search
CPC ......... F16L 33/24; F16L 33/003; F16L 33/18; F16L 33/16; F16L 33/227; F16L 33/222
See application file for complete search history.

(56) References Cited

U.S. PATENT DOCUMENTS 1,843,123 A * 2/1932 Croslen .................... F16L 33/23
                                                                  285/253
1,853,584 A   4/1932 Stoddard
(Continued)

FOREIGN PATENT DOCUMENTS

CH    128924      11/1928
EP    0310234     4/1989
(Continued)

*Primary Examiner* — James M Hewitt, II
(74) *Attorney, Agent, or Firm* — Defillo & Associates, Inc.; Evelyn A. Defillo

(57) ABSTRACT

Hose has a body and a mouthpiece connected with the body. The mouthpiece is slidably placed against the body and is mounted at the end of the hose and includes a thickening. The ending has a circumferential stop placed in the axis of the mouthpiece. The stop has on its circumference a touch surface which is oriented inside, against the thickening on the mouthpiece. The mouthpiece is sealed by sealing ring against the body. The ring is placed in the sealing zone, or the mouthpiece is connected with the body by a flexible bellow. During the movement of the mouthpiece outside the touch surface and the outer surface of the hose in the zone with the thickening draw closer and the hose is held on the mouthpiece by the under pressure between the surface of the stop and the thickening.

10 Claims, 4 Drawing Sheets

(51) Int. Cl.
F16L 33/18 (2006.01)
F16L 33/24 (2006.01)

(56) References Cited

U.S. PATENT DOCUMENTS

| | | | |
|---|---|---|---|
| 2,047,714 A | | 7/1936 | Smith |
| 5,498,043 A | * | 3/1996 | Goldenberg .......... F16L 33/226 |
| | | | 285/251 |
| 5,794,986 A | * | 8/1998 | Gansel ................ F16L 33/222 |
| | | | 285/148.16 |
| 6,685,986 B2 | * | 2/2004 | Oldenburg ............... C08K 9/02 |
| | | | 427/217 |
| 6,695,355 B1 | * | 2/2004 | Giuffre ................ F16L 47/041 |
| | | | 285/255 |
| 7,648,178 B1 | * | 1/2010 | Andros ................ F16L 33/223 |
| | | | 285/247 |
| 7,661,720 B2 | * | 2/2010 | Nakano ................ F16L 13/103 |
| | | | 285/242 |
| 2007/0052231 A1 | * | 3/2007 | Li ........................ F16L 33/223 |
| | | | 285/247 |
| 2012/0274064 A1 | | 11/2012 | Moore |

FOREIGN PATENT DOCUMENTS

| | | | | |
|---|---|---|---|---|
| GB | 692787 | | 6/1953 | |
| GB | 2051280 | | 1/1981 | |
| GB | 2251044 A | * | 6/1992 | ............ F16L 33/227 |
| JP | 2016044763 | | 4/2016 | |
| WO | WO2016132745 | | 8/2016 | |

\* cited by examiner

HOSE ENDING, MAINLY AS CONNECTING ELEMENT

CROSS REFERENCE TO RELATED APPLICATION

This application is a national stage entry of PCT/162018/054185 filed Jun. 9, 2018, under the International Convention and claiming priority over Slovakia Patent Application No. PUV 50056-2017 filed Jun. 9, 2017 and Slovakia Patent Application No. PUV 50058-2018 filed Jun. 7, 2018.

FIELD OF TECHNOLOGY

Technological solution concerns the ending of the hose or flexible pipe. The ending is designed mainly for production of a joint (connection) between the ending of the hose and other element which can be part of the connecting element, end blinding, flange connection, armature, and so on.

BACKGROUND OF THE PRIOR ART

Various technical solutions are used in order to connect the ending of the flexible hose with the solid connecting element, where the hose is stuck onto the mouthpiece, where it is held by various mechanical connecting members. Hose clips are common, as are metal pulling straps by means of which the hose is clamped on the mouthpiece.

There exist solutions with outer sleeve (socket) which has a conical surface and during the screwing it presses the segments distributed on the circumference of the ending in such a way that these segments press the ending of the hose to the mouthpiece. Such solution is relatively simple, but not reliable enough; during the higher pressure the holding of the hose on the mouthpiece is problematic and the little segments are prone to breaking. Similarly, the solution pursuant to publication JP2016044763A uses a thickening of the mouthpiece, on which the hose is pressed by the screw sleeve. The solution is relatively difficult and the mounting of the hose always requires screwing.

Published patent file US2012/0274064A1 discloses an ending of the hose which has a solid mouthpiece with thickening on its end and which has a slidable sleeve which enters into the cavity in the body of the hose (see mainly FIG. 17). The sleeve during sliding out encircles the hose on the mouthpiece. In order to produce sufficient pressure, it is necessary to press the sleeve outside; the pressure in the hose than acts in a direction which pulls the hose from the mouthpiece and, at the same time, from the connection with the sleeve. The separability of the sleeve is another disadvantage; the sleeve can get lost during mounting or operation. The sleeve requires relatively precise guiding inside the cavity of the body of the ending.

Publication GB 2251044 A discloses an arrangement with the divided mouthpiece, which has a solid part produced as a part of the body of the ending, and slidable part place within the solid part of the mouthpiece. The thickening is divided into two relatively similar parts and it is produced on the solid part of the mouthpiece and on the slidable part of the mouthpiece, too. The hose is stretched, pulled over the thickening to the solid part of the mouthpiece. The stop which acts against the thickening on the slidable part of the mouthpiece is produced on the sleeve and it is connected to the body of the ending by means of a thread. Such solution requires multiple components and the hose is unsuitably connected to the solid part of the mouthpiece, whereby the pressure in the hose causes the hose to slip out of the solid part of the mouthpiece without the mouthpiece pressing to the stop more by means of the same force. The grip of the hose between the stop and thickening is produced only by screwing of the sleeve with the stop to the body of the ending, and it can get loosened later.

Such simple technical solution is desired and not known, which will allow quick mounting of the ending on the hose without tools, and which will be reliable during operation and easy to produce.

SUMMARY OF THE INVENTION

The deficiencies in the prior state of the art are significantly remedied by the ending of the hose, mainly as connecting element, where the ending includes a body with an opening and a mouthpiece connected with the body, where the mouthpiece is designed for being slid or pushed onto the ending of the hose, where the mouthpiece has on the outer end a thickening designed for holding the hose on the mouthpiece according to this technical solution which essence lies in the fact that the mouthpiece is slidably placed inside the body, the ending has a circumferential stop with the opening for the hose, placed in the axis of the mouthpiece; the stop is connected with the body whereby the stop has a touch surface alongside the circumference, whereby this surface is oriented inside the body, against the thickening on the mouthpiece. The mouthpiece is sealed against the body; this sealing does not prevent the slidable placement of the mouthpiece inside the body. Usually the mouthpiece will be placed in the axis of the body. The opening in the place of the circumferential stop will usually have a diameter which corresponds to the outer diameter of the hose, or, eventually, there is a certain gap for easier insertion, sliding of the hose. From the outer side, that is, opposite to the circumferential stop, the cone can follow the opening, which makes the directioning of the hose into the opening easier.

If the outer surface of the hose is smooth enough, the mouthpiece does not have to be sealed against the body of the ending; the contact of the circumferential stop with the outer surface of the hose will become the place of sealing. It is more reliable to produce a sealing zone within the mouthpiece, which does not prevent the sliding and seals the mouthpiece against the body of the ending.

Slidable placing allows the mouthpiece to move inside the body towards the stop, and to slide back inside the body of the ending. On one side the ending can be delimited by the body which has a mouthpiece inserted in its opening from the inside; on the other end the ending can be delimited by the stop. The stop can be connected with the body of the ending in various ways pursuant to the size and pursuant to the cross-section shape of the ending. In case the ending has a circular cross-section, which is common in cases of the hoses with circular cross-section, it is preferable if the stop is produced at the end of the circumferential wall which is a continuation of the body of the ending. In such case the circumferential wall with the stop produces a cavity inside which the mouthpiece is, whereby between the circumferential wall and the mouthpiece there is a gap whose thickness is at least corresponding to the thickness of the wall of the hose; in this way the cavity allows form the movement of the hose on the mouthpiece. The cavity in the body is thus designed for introduction of the hose onto the mouthpiece inside the cavity. In such arrangement the stop, the circumferential wall and the body of the ending, too, can be formed by a single body, whereby the simple construction with only two independent components is achieved.

In another arrangement the stop can be connected to the body of the ending by two or multiple draw rods. The connection of the stop to the body must be capable of transferring the forces from the stop to the body of the ending. It is a task of the stop to capture the mouthpiece during its movement out of the body of the ending. Any mechanical connection between the stop and the body of the ending, for example circumferential wall, at least two and preferably at least three cords, draw rods, and so on, corresponds to this task.

The stop does not allow the mouthpiece to slide out of the body's cavity if the hose is put on the mouthpiece. In the place of deformation, where the hose is put over the thickening on the mouthpiece, the hose has a diameter which is larger than the inner diameter of the circumferential stop. After the putting of the hose on the mouthpiece the pair mouthpiece/circumferential stop produce a self-locking joint, an increase of the pressure of the medium; an increase of the pulling produces large force of lock (grip). The difference between the inner diameter of the touch surface of the stop and the outer surface of the thickening on the mouthpiece is less than twice the thickness of the wall of the hose, so that the capturing of the surface of the hose on the circumferential stop takes place.

The mouthpiece has a thickening on one end. This thickening is in the ending oriented outside, that is towards the connection of the hose. The mouthpiece has a waist which is designed to lean to the ending of the hose. The waist has a diameter less than the diameter of the thickening; usually the diameter of the waist will correspond to the inner diameter of the hose. During the pulling induced, for example, by the pressure of the medium in the hose, or induced by the outer force, these forces are transferred from the hose put on the waist onto the mouthpiece, and by this the mouthpiece is pulled out of the body towards the stop.

A sealing zone of the mouthpiece follows the waist of the mouthpiece; the task of this zone is the slidably seal the mouthpiece placed against the body of the ending. The sealing zone of the mouthpiece can in one group of realizations be formed by a continuation of the waist with the same diameter or with the diameter that is less than the diameter of the thickening. In such case the mouthpiece has largest diameter in the place of the thickening and the diameter of the thickening is at the same time equal to or smaller than the diameter of the opening in the circumferential stop. This allows to put, slide the mouthpiece to the body through the opening in the circumferential stop. The body of the ending in such case can have a mount (or flange) on the side opposite to the circumferential stop, whereby this mount delimits the extreme position of the mouthpiece inside the body.

In another group of realizations, the mouthpiece can be construed in such a way that it is inserted from the other side of the body. In such case the thickening can have a larger outer diameter than is the inner diameter of the opening in the circumferential stop. The sealing zone of the mouthpiece in this arrangement has an outer diameter that is identical or larger that the outer diameter of the thickening. The larger outer diameter of the sealing zone ensures the production of the larger force which presses the mouthpiece against the circumferential stop. This produces a hydraulic multiplication of the force. The surface upon which the medium acts through its pressure in the cross-section of the sealing zone grows quadratically with the growth of its diameter. The doubling of the diameter of the mouthpiece in its sealing zone causes a quadruple increase of the force by which the mouthpiece is pressed against the circumferential stop. This effect can be used to achieve a reliable sealing even with hoses which are not very flexible.

With the second group of realizations there has to be an opening in the body of the mouthpiece on the side opposite to the circumferential stop which is larger than the outer diameter of the thickening; usually it will be larger than the outer diameter of the sealing zone of the mouthpiece. Such shape of the body is preferably used with larger endings which are designed for connection, for example, to the water valves, where the body of the ending is ended by the inner thread for the connection with the respective armature or fitting.

The term "mouthpiece" in this text denotes a pipe, mainly of the cylindrical cross-section, on which the ending of the hose is put, or pulled. The mouthpiece can have different cross-section, for example elliptical, flat or rectangular with the rounded corners. The thickening of the mouthpiece constitutes an enlargement of the diameter of the pipe at its end; it can have, for example, conical shape that is common in case of the mouthpieces on which the hose is secured by the pulling tape or fastener, where usually there are multiple conical thickenings placed one behind each other, ended by the jump reductions of the diameter to the diameter of the waist of the mouthpiece. "Outer ending" or "outer side" is an ending or a side on the side of the end of the hose which is connected to the ending. The term "hose" denotes any pipe element regardless of the material its composed of; it can be plastic, rubber or other pipe which allows to pull on a mouthpiece with the thickening.

The significant feature of the proposed technical solution is the fact that the mouthpiece in the body of the ending is placed in such a way that partial movement against the body of the ending is allowed. It will be preferable if the movement or sliding of the mouthpiece is delimited by the stops; the sliding in order of millimeters suffices. On one side the fold of the mouthpiece can be restricted by the gradation of the opening in the body of the ending.

The end of the hose is inserted inside the ending where the end of the mouthpiece is led through the middle opening in the circumferential stop. The end of the mouthpiece has a diameter which allows to lead the end of the hose at least to the beginning of the mouthpiece. Further pressure moves the end of the hose through the thickening. During such guiding of the hose the mouthpiece is moved towards the body of the ending where the front of the mouthpiece leans to the mount (flange) inside the opening of the body of the ending. The end of the hose thanks to its flexibility passes through the zone with the thickening and usually it is pressed through to the waist of the mouthpiece and towards the body of the ending. The hose is now mounted on the mouthpiece, but aside of the flexibility of the material of the hose the hose lacks other source of lock or grip on the mouthpiece. With any pressure in the hose the mouthpiece is pressed outside the body of the ending. This movement creates a state where the hose presses onto the touch surface in the place where it encircles the thickening on the mouthpiece. Since by the movement of the mouthpiece outward the touch surface of the stop and the outer surface of the hose in the zone with thickening are getting closer and the difference between the diameter of the touch surface and the diameter of the thickening is less than double the thickness of the wall of the hose, the hose is kept on the mouthpiece by the pressure between the touch surface and the thickening. The force necessary to move the mouthpiece in the opening of the body has to be smaller than the force necessary to pulling the hose off the mouthpiece, which is simply ensured by the dimension of the thickening and the length of the mouthpiece. The overpressure in the hose in such arrangement acts mainly on the sliding of the mouthpiece to the stop, and thereby creates a pressure of the hose on the mouthpiece in the place of thickening.

The lock of the hose between the stop surface and the mouthpiece can except of the mechanical lock of the hose on the mouthpiece ensure the tightness, seal of the hose against the mouthpiece, or a sealing can be inserted between the hose and the mouthpiece.

The mouthpiece can be sealed against the body of the ending by the sealing ring (gasket) which is mounted on the mouthpiece in its sealing zone. The sealing ring can lean with its outer diameter on the inside of the circumferential wall or on the opening in the body of the ending. This sealing ring can also work as a stop against the movement of the mouthpiece outside the body in case there is no hose mounted on the mouthpiece. After the mounting of the hose it is not possible to move the mouthpiece over the circumferential stop.

The thickening can have various shape; it is preferable if the shape is conical, by which the end of the hose is led onto the mouthpiece. It is also preferable if the touch surface of the stop has conical shape which corresponds to the conical shape of the thickening on the mouthpiece. This produces two parallel conical surfaces between which the material of the hose is gripped. The thickening can be produced during the injection molding of the mouthpiece or, in case the mouthpiece is metal, the thickening can be produced by shaping, rolling of the end of the mouthpiece.

In the preferable arrangement of the first group of realizations the body of the ending will have cylindrical shape. On the side designed for the insertion of the hose the ending will have central opening passing to the cavity of the ending. In the axis of the body a cylindrical mouthpiece is placed which is slidably led in the opening of the body of the ending. This opening is graduated in such a way that the inner front of the mouthpiece leans onto the mount in the opening of the body of the ending in the position where a gap is produced between the thickening on the mouthpiece and the touch surface of the stop, whereby this gap corresponds at least to the thickness of the wall of the hose. During the pressing of the hose onto the mouthpiece there is no significant force acting of the touch surface of the stop and the outer surface of the hose, which could prevent the sliding of the hose onto the mouthpiece. The cavity in the body of the mouthpiece has dimensions and shape which allow the flexible pushing of the end of the hose through the thickening onto the mouthpiece. The inner diameter of the cavity in the place of thickening which exists in the position when the mouthpiece is pressed into the body of the hose is larger than the sum of the diameter of the thickening and double of the thickness of the wall of the hose.

In case of second group of the realizations it will be preferable if the end of the hose is pulled firstly on the body of the ending without the mouthpiece and then the hose is pulled on the mouthpiece. The pulling of the hose on the mouthpiece in this phase is not hidden inside the body, which simplifies the pulling. Subsequently the body is moved on the hose towards the mouthpiece and the mouthpiece with the pulled-on hose is pushed inside the body. The advantage of the second group of the realizations is the compact and short construction of the ending which allows for connection of the larger diameters of the threads, for example outlets of the water or irrigation valves. The inner thread on the ending with its diameter suitable follows the cavity of the body with the sealing zone of the mouthpiece. The body has an effective shape with the gradual transitions of the diameters and can be productively produced by the injection molding with relatively simple mold. Nor mouthpiece, neither body have small protruding segments or flexible elements which would have complicated the mold.

On one side the hose enters the body of the ending; on the other side the ending can have various connecting shape or it can be blinded in case the ending should close the hose. The other side of the ending can be equipped with thread and/or sealing for connection with another element and/or can be equipped by a flange or it can continue as a part of another component with which it forms a whole. The ending does not have to have cylindrical outer shape necessarily; mainly, for example, if it will be part of the other, superior component. What is essential is that the mouthpiece is placed slidably and against the thickening on the mouthpiece there is a touch surface of the stop produced and directed outside the hose and inside the ending; that is, so that force action of the stop acts against the pulling off of the mouthpiece with the mounted (pulled on) hose. The ending can also on the other side continue with the similar arrangement with the slidable mouthpiece, where the ending will form the connecting element for the connection of the two hoses.

The cylindrical mouthpiece is slidably inserted inside the body of the ending. In order to allow the sliding the mouthpiece in a different arrangement can be connected with the body of the ending by means of a flexible member, for example bellows, accordion joint. Such solution allows to produce the body of the ending together with the mouthpiece, for example, by means of the injection molding.

The advantage of the proposed technical solution is the simple construction with small number of components, and mainly the simple and very quick mounting of the hose onto the ending without tools; it suffices to press the end of the hose onto the mouthpiece in the cavity of the ending, or independently. The produced joint is very reliable since the increased pressure in the hose increases the pressure of the hose onto the mouthpiece, which increases the sealing effect of the joint. The joint is resilient against the material degradation of the hose, too, which hitherto required subsequent tightening of the screws of the endings. The proposed technical solution ensures continual delimiting and tightening of the connection of the hose with the mouthpiece even in applications where the ending is exposed to the vibrations, for example in the engine space of the vehicles. Another advantage is the shape freedom of the cross-section of the hose; the solution is not limited to the cylindrical cross-section as is the case in case of screw mounts (sockets); the solution can be used even in cases of the hoses of rectangular shape, whereby the pressure of the hose onto the mouthpiece is even alongside the circumference and it is not limited to the corners of the profile.

Suitable design of the technical solution can achieve the rotational freedom of the hose against the ending, too; given the absence of the pressure of the medium the hose can freely rotate together with the mouthpiece in the body of the ending. Such solution is preferable in cases of many technical applications where there is a constant relative movement of the hose against the element to which the hose is connected by means of the ending.

Both main components the body and the mouthpiece have solid form without fragile protrusions and without flexible lamellas which in cases of known solutions form means for pressing of the hose to the mouthpiece. Thanks to this the proposed solution is compact and durable even if it is used roughly and inconsiderately.

Another advantage of the proposed solution is the option of inability to disassemble the connection of the hose and the ending. The pull on the sliding out of the hose from the mouthpiece creates a stronger lock of the hose in the mouthpiece, but only in case the mouthpiece is held on the stop directed inside the body of the hose; for example, by a simple tool it is possible to simply pull the hose off.

DESCRIPTION OF DRAWINGS

The technical solution is further disclosed by means of the drawings 1 to 8. The used scale of the depiction and ratio of sizes of individual elements, for example, ratio of sizes of the mouthpiece and the body of the ending, does not have to correspond to the description in the examples and these scales and ratios of sizes cannot be interpreted as limiting the scope of protection.

FIG. 1 is a view of the ending during the insertion of the hose to the opening of the ending, where the hose is directed onto the mouthpiece. The arrow denotes a direction of pushing of the hose onto the mouthpiece.

FIG. 2 depicts the pushing of the hose onto the mouthpiece, which is leaned onto the stop in the opening of the body.

FIG. 3 is a view of the working surface of the connection of the ending and the hose, where the hose is gripped between the stop and the thickening of the mouthpiece. The arrow denotes a direction of the force by which the mouthpiece with the hose are pressed against the circumferential stop.

FIG. 4 depicts individual parts of the mouthpiece, where the waist gradually passes to the sealing zone.

FIG. 6 depicts a hose during the pulling of the hose onto the mouthpiece. The arrow shows a direction of the movement of the mouthpiece inside the hose.

FIG. 7 depicts an ending with the mounted hose in the active position.

FIG. 8 depicts individual parts of the mouthpiece from the second group of the realizations; the sealing zone of the mouthpiece has an outer diameter larger than the waist and thickening.

EXAMPLES OF REALIZATION OF TECHNICAL SOLUTION

Example 1

Figure 1:
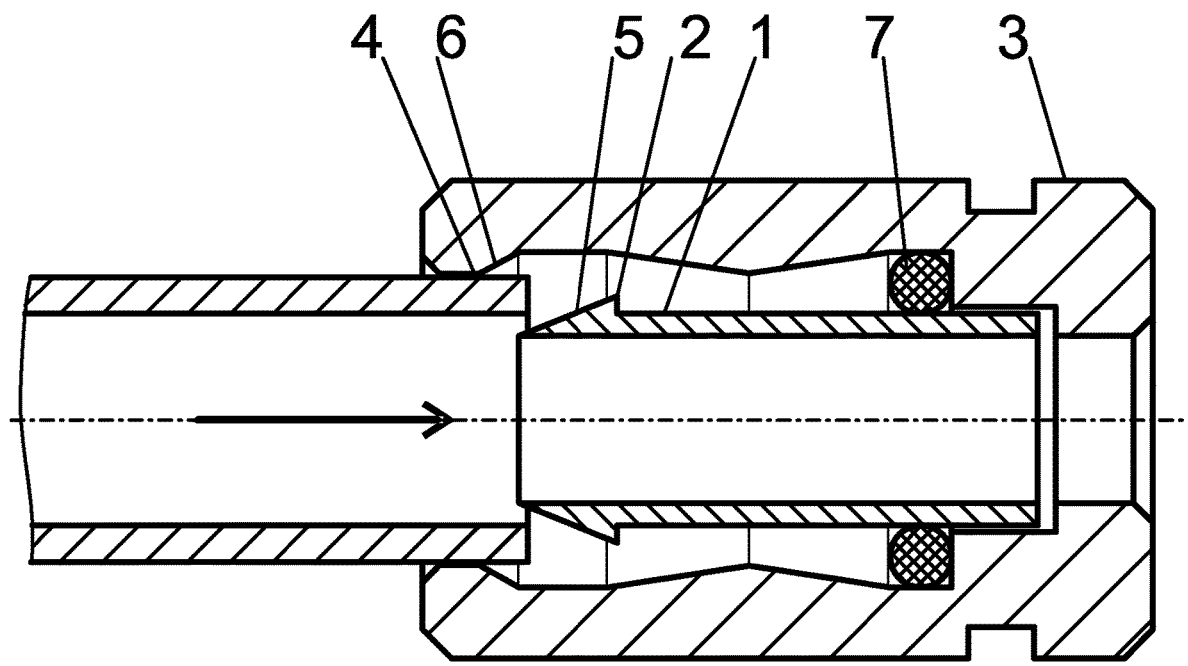
FIGS. 1 to 4 depict the ending in the first group of realizations, where the mouthpiece is inserted to the body through the opening in the circumferential stop.
Figure 2:
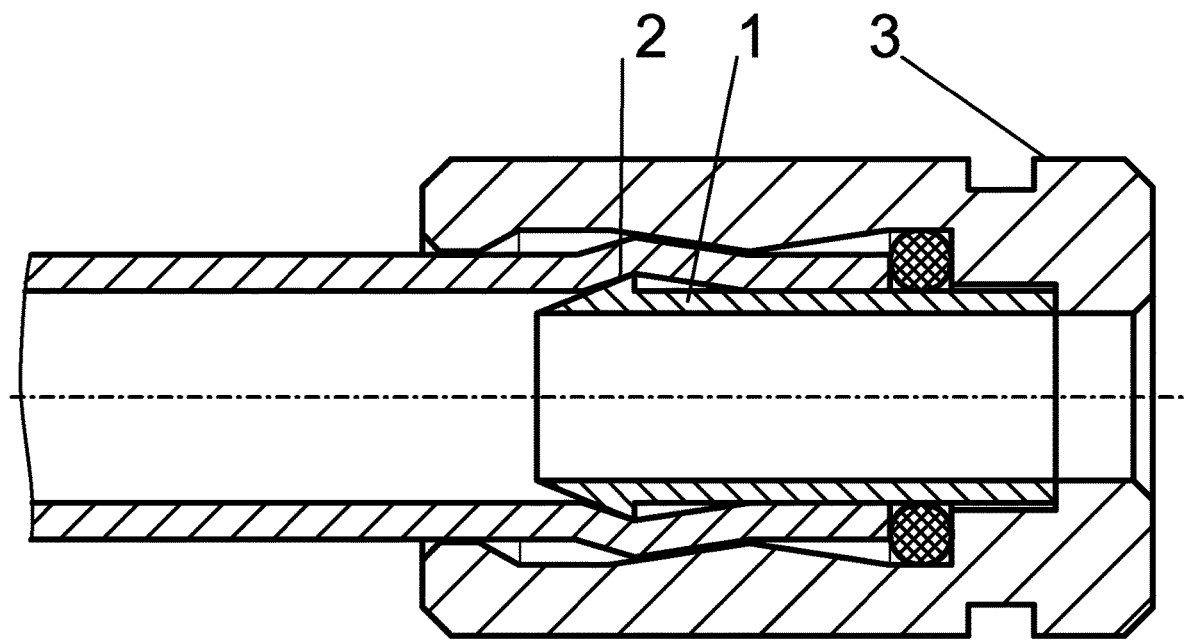
Figure 3:
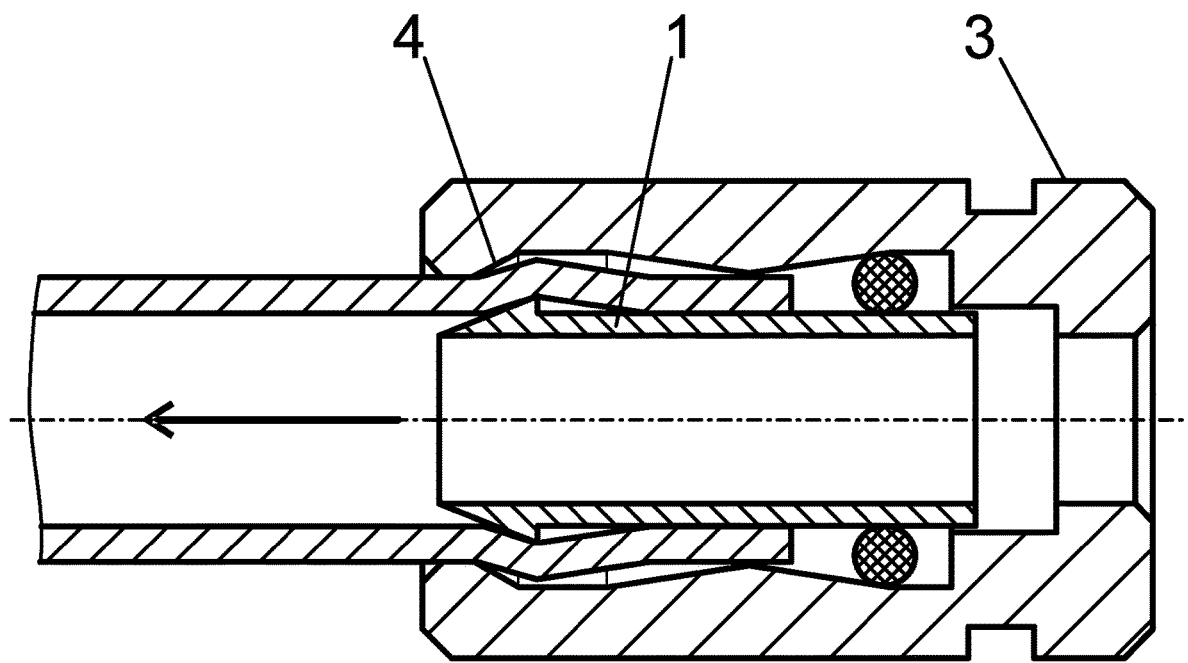
Figure 4:
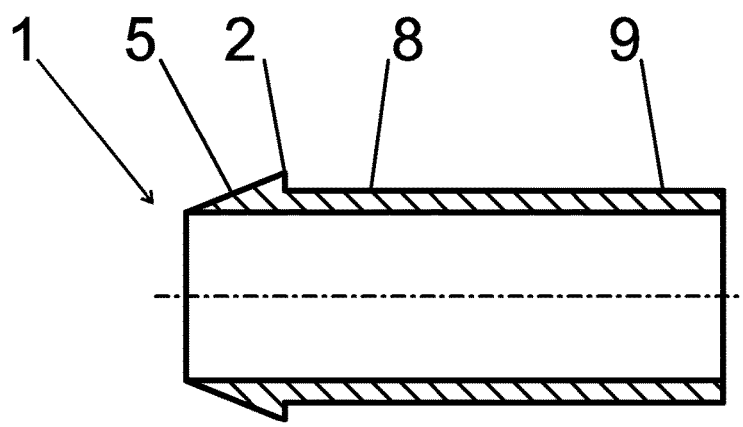

In this example according to FIGS. 1 to 4 the ending is connected with the hose for the distribution of water. The ending has a body 3 produced from plastic, which is designed for connection with the armature. The ending has a stop 4 with the inner conical surface 6 which is oriented against the conical surface 5 on the mouthpiece 1. The mouthpiece 1 is placed in the cavity of the ending; it is slidably led in the body 3 and it is sealed against the body 3 by means of the sealing ring 7. On the mouthpiece 1 there is a thickening 2. The mouthpiece 1 proceeds further by the waist 8 with the diameter which corresponds to the inner diameter of the hose. The sealing zone 9 follows upon the waist 8. The mouthpiece 1 in this example of realization is inserted inside the body 3 through the opening in the circumferential stop 4. The outer diameter of the thickening 2 is smaller than the inner diameter of the opening in the circumferential stop 4 and at the same time the difference between the diameter of the stop 4 and the outer diameter of the thickening 2 is less than twice the thickness of the wall of the hose.

The hose is inserted into the opening in the ending and pushed onto the mouthpiece 1 by pressure. Thereby the mouthpiece 1 is pushed into the body 3. The subsequent pulling of the hose or the effect of the overpressure of the medium inside the hose causes a movement of the mouthpiece 1 with the mounted hose outside the body 3. The hose, deformed in the zone thickening 2, has a diameter that is larger than the opening in the stop 4 and the pushing out of the mouthpiece 1 from the body 3 is stopped at the stop 4. The conical surface 6 on the stop 4 and the conical surface 5 on the mouthpiece 1 hold the hose and thereby ensure its tightness against the mouthpiece 1.

After the release of the pressure in the hose the mouthpiece 1 can be once again moved into the body 3 of the ending; the visible space of the movement of the hose with the mouthpiece 1 does not affect the tightness of the join in any way.

In this example of realization there are inner conical surfaces produced in the cavity of the ending. The first conical surface leads the hose during the pushing onto the mouthpiece 1. The second conical surface forms a support for the sealing ring 7, whereby it delimits its course of movement during the pulling out of the mouthpiece 1.

In this example the body 3 with the circumferential wall and stop 4 is pressed from the plastic as a single component. The other independent component of the ending is the plastic mouthpiece 1. The sealing ring 7 keeps the mouthpiece 1 in the body 3 during the state without the mounted hose. After the hose is mounted, the mouthpiece 1 cannot be pulled out of the ending.

Example 2

Figure 5:
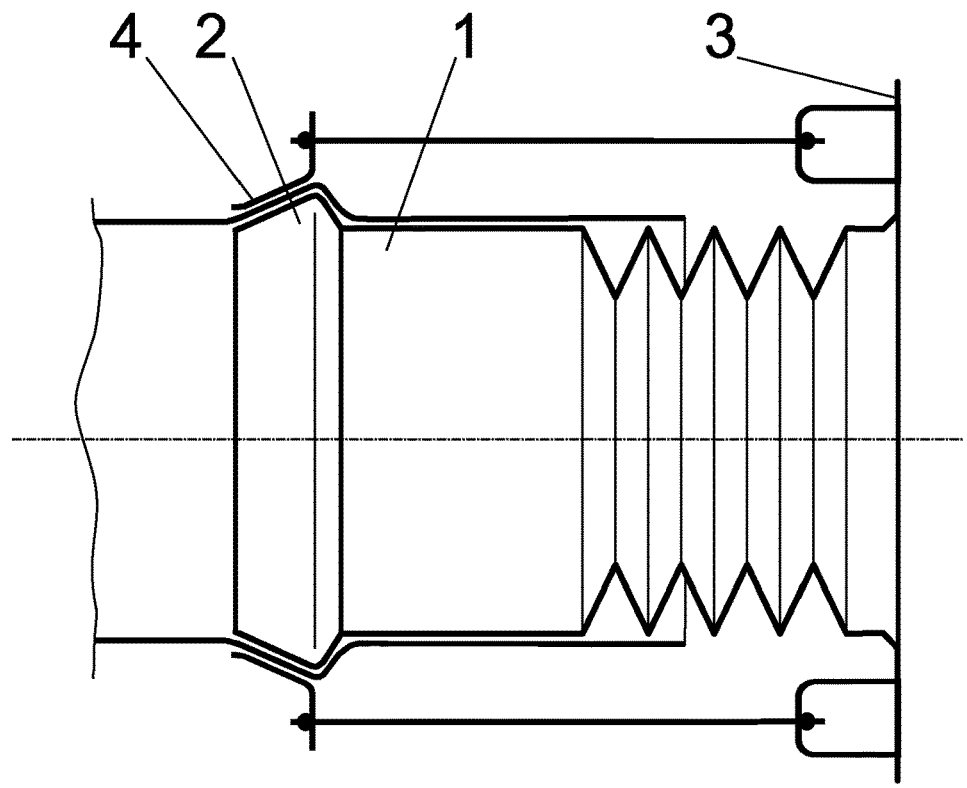
FIG. 5 depicts a solution where the mouthpiece is connected with the body of the ending by means of flexible bellows. The fold of the bellows is enlarged for the purposes of clarity; in reality the bellows can have different shape and size.

Ending in this example according to FIG. 5 forms a part of the suction pipe of the engine. The mouthpiece 1 and the body 3 are produced as one whole from the plastic. In order to allow the movement of the mouthpiece 1 against the body 3, the mouthpiece 1 is connected with the body 3 by means of flexible bellow, so-called accordion. A hose is mounted onto the mouthpiece 1 with approximately rectangular cross-section with rounder corners; the reverse movement of the mouthpiece 1 with the hose causes its locking on the stop 4. The stop 4 in this example has a form of a ring which has opening corresponding to the profile of the hose and the profile of the mouthpiece 1, and it is connected with the body 3 by four draw rods. The draw rods produce an advantageous semi-solid fixing of the hose into the body 3, whereby the bellow causes prestress which keeps the pressure of the stop 4 on the hose, which ensures the tightness of the joint even in case of underpressure in the suction pipe.

Example 3

Figure 6:
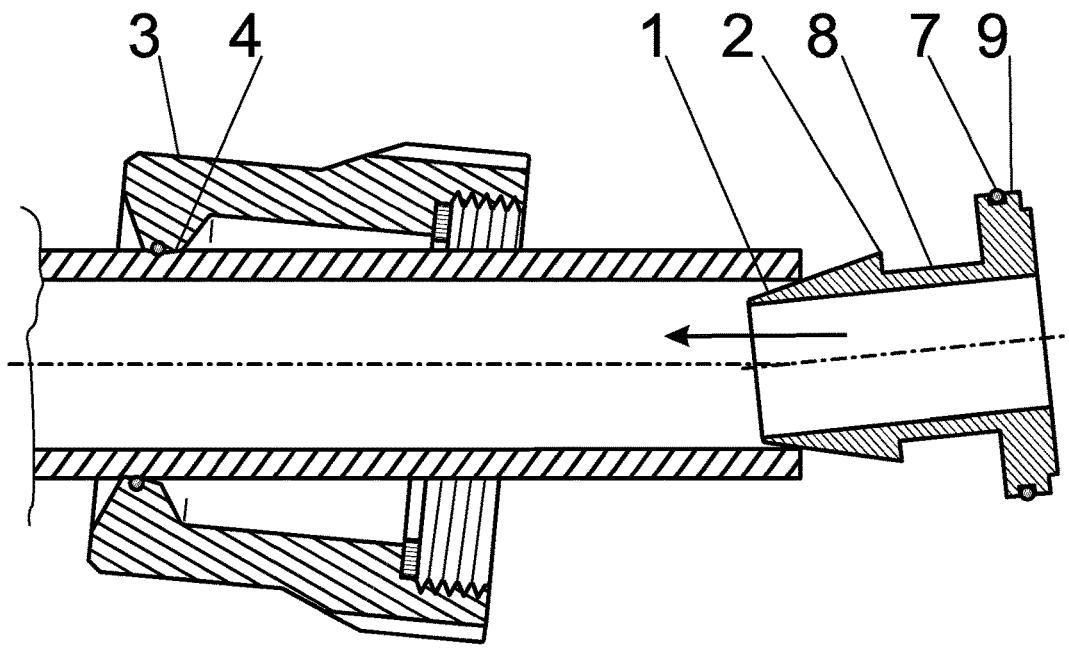
FIGS. 6 to 8 depict the ending from the second group of realizations, where the mouthpiece is pressed into the body from the opposite side than where the body has a circumferential stop with the opening for the hose.
Figure 7:
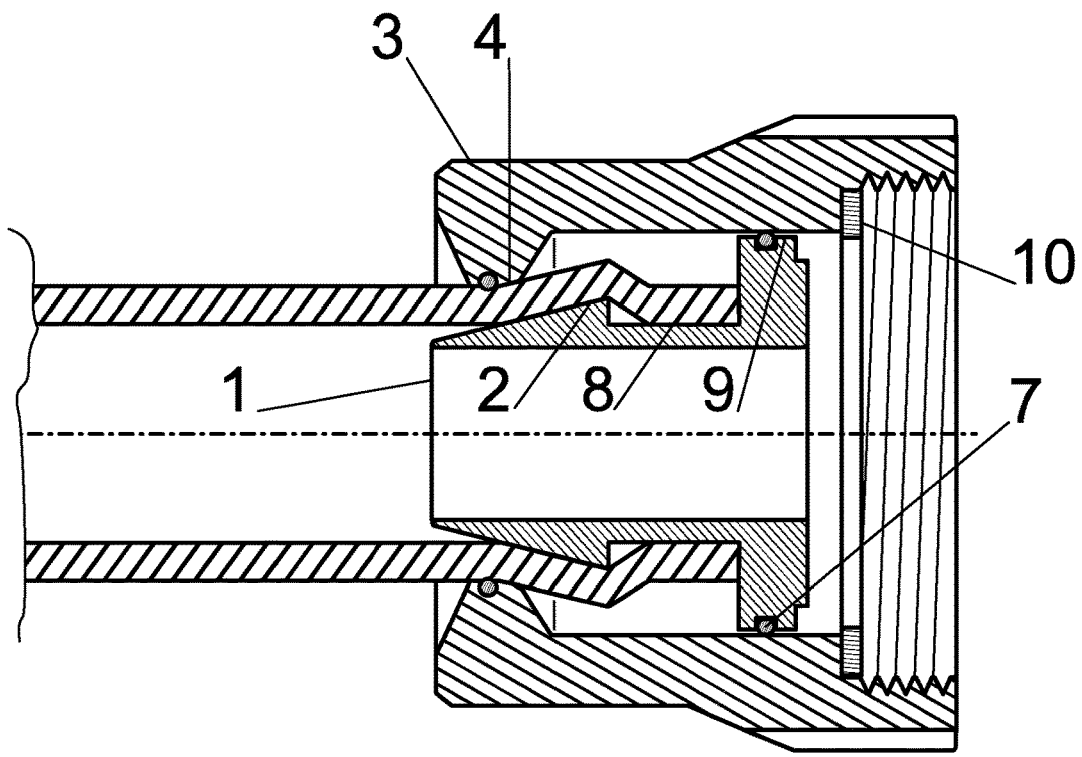
Figure 8:
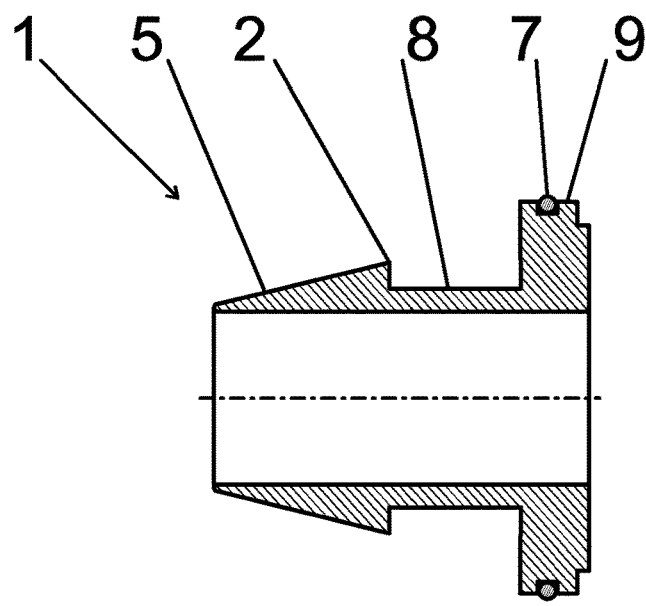

In this example according to FIGS. 6 to 8 the ending is designed for connection of the hose with the water valve. The ending has a plastic body 3 which has grooves on the outer circumference in order to simplify the screwing of the body 3 to the outer thread on the water valve. A flat circular seal (sealing) 10, leaning on the mount in the body 3, is used in order to seal the ending against the water valve.

The body 3 has a circumferential stop 4 on one end, whereby the stop 4 is oriented against the thickening 2 on the mouthpiece 1. The mouthpiece 1 is inserted inside the body 3 from the side which has a thread for connection to the water valve. The mouthpiece 1 has thickening 2 with a conical surface 5, it also has a waist 8 which is followed by a sealing zone 9. The sealing zone 9 in this example has a disc with a diameter larger than the outer diameter of the thickening 2. There is a groove in the disc, and inside the groove is a sealing ring 7. The mouthpiece 1 is placed in the cavity of the ending; it is slidably led in the body 3 and it is sealed against the body 3 by means of the sealing ring 7. The disc is slidably led in the cylindrical cavity of the body 3.

The hose is first mounted on the body 3 without the mouthpiece 1. Then the end of the hose is pulled onto the mouthpiece 1. The end of the hose is pulled on the thickening 2 and on the waist 8 towards the disc in the sealing zone 9. The body is moved to the end of the hose and the end of the hose together with the mouthpiece 1 is pushed inside the body 3. The body 3 with the sealing 10 is connected to the outlet of the water valve. The pressure of the water pushes the mouthpiece 1 against the stop 4 which presses onto the surface of the hose in the place of thickening 2. After the release the joint and the ending are simple to disassemble and they can be used repeatedly on other hoses with approximately similar diameter and thickness of the wall.

The outer pull on the hose, for example during the manual pulling of the hose, acts in the direction of the movement of the mouthpiece 1 with the mounted hose outside the body 3. The hose in the zone of thickening 2 has a diameter which is larger than the opening in the stop 4 and the pulling out of the mouthpiece 1 from the body 3 is stopped at the stop 4.

In this example of realization, the groove is produced on the inner diameter of the opening in the circumferential stop 4 and the "O" ring is inserted into the groove, whereby the ring holds the hose and allows the rotation of the hose with the mouthpiece 1 against the body 3.

The body 3 is pressed from the plastic as a single component; the mouthpiece 1 is pressed as the other component. Both main components have solid form without fragile protrusions and flexible lamellas, such as those known in the state of the art.

INDUSTRIAL APPLICABILITY

Industrial applicability of the technical solution is obvious. According to this technical solution it is possible to industrially and repeatedly produce and use the endings of hoses for various uses, such as air, water or other liquids distribution in the industry or in vehicles, agriculture and at home.

LIST OF RELATED SYMBOLS

1—mouthpiece
2—thickening
3—body
4—stop
5—conical surface on the mouthpiece
6—conical surface on the stop
7—sealing ring
8—waist of the mouthpiece
9—sealing zone
10—seal/sealing

The invention claimed is:

1. An ending for a hose comprising:
a body (3) having a cavity, a first ending, and a second ending; and
a mouthpiece (1) provided as one whole with the body (3); wherein the mouthpiece (1) is connected with the body by a flexible bellows; the mouthpiece (1) adapted to be pushed via action of the bellows to an end of the hose, and the mouthpiece (1) has a first end having a thickening (2), a second end including a sealing zone (9), and a waist (8) located between the first end and the second end of the mouthpiece, the thickening (2) holds the hose on the mouthpiece (1);
wherein the second ending of the body (3) has a circumferential stop (4), the circumferential stop (4) is oriented against the thickening (2) of the mouthpiece (1);
wherein the stop (4) has a touch surface on its circumference, whereby the touch surface is located inside and against the thickening (2) on the mouthpiece (1);
wherein an outer diameter of the thickening (2) is larger than an inner diameter of the stop (4); or a difference between the outer diameter of the thickening (2) and the inner diameter of the stop (4) is less than twice the thickness of a wall of the hose;
wherein the stop (4) has an inner conical surface (6) and the thickening (2) has an outer conical surface (5); the inner conical surface (6) and the outer conical surface (5) have a same orientation;
wherein when the hose is placed on the mouthpiece, and then moved into a position, the mouthpiece and the circumferential stop produces a self-locking joint.

2. The ending for the hose according to claim 1, wherein the axis of the mouthpiece (1), the axis of the body (3) and the axis of the stop (4) with the opening are identical.

3. The ending for the hose according to claim 1, wherein the opening in the circumferential stop (4) includes a cone oriented outside.

4. The ending for the hose according to claim 1, wherein the mouthpiece (1) is rectangular or polygonal cross-section with rounded corners.

5. The ending for the hose according to claim 1, wherein the body (3) is a part of a piping system.

6. The ending for the hose according to claim 1, wherein the body (3) is made of plastic and wherein the mouthpiece (1) is made of plastic or metal.

7. An ending for a hose comprising:
a body (3) having a cavity, a first ending, and a second ending; and
a mouthpiece (1) placed on the cavity of the body (3); the mouthpiece (1) adapted to be pushed to an end of the hose, and the mouthpiece (1) has a first end having a thickening (2), a second end including a sealing zone (9), and a waist (8) located between the first end and the second end of the mouthpiece, the thickening (2) holds the hose on the mouthpiece (1);
wherein the second ending of the body (3) has a circumferential stop (4), the circumferential stop (4) is oriented against the thickening (2) of the mouthpiece (1);
wherein the mouthpiece (1) slides inside the cavity of the body (3) towards the stop (4);
wherein the stop (4) has a touch surface on its circumference, whereby the touch surface is located inside and against the thickening (2) on the mouthpiece (1);
wherein an outer diameter of the thickening (2) is larger than an inner diameter of the stop (4); or a difference between the outer diameter of the thickening (2) and the inner diameter of the stop (4) is less than twice the thickness of a wall of the hose;

wherein the stop (4) has an inner conical surface (6) and the thickening (2) has an outer conical surface (5); the inner conical surface (6) and the outer conical surface (5) have a same orientation;

wherein when the hose is placed on the mouthpiece, and then moved into a position, the mouthpiece and the circumferential stop produces a self-locking joint;

wherein the sealing zone includes a sealing ring (7); and wherein the sealing zone (9) has an outer diameter that is larger than the inner diameter of the opening in the stop (4).

8. The ending for the hose according to claim 7, wherein the sealing zone (9) includes a disc with a groove to insert the sealing ring (7), wherein the disc follows upon the waist (8) of the mouthpiece (1).

9. The ending for the hose according to claim 7, wherein the body (3) has an inner thread with a diameter larger than the outer diameter of the sealing zone (9) on a side opposite to the stop, and the body (3) has a flat sealing (10) sealing a connection of the ending with a connected element; whereby the sealing (10) leans onto the mount in the body (3) by an end of the inner thread.

10. An ending for a hose comprising:
a body (3) having a cavity, a first ending, and a second ending; and
a mouthpiece (1) placed on the cavity of the body (3); the mouthpiece (1) adapted to be pushed to an end of the hose, and the mouthpiece (1) has a first end having a thickening (2), a second end including a sealing zone (9), and a waist (8) located between the first end and the second end of the mouthpiece, the thickening (2) holds the hose on the mouthpiece (1);

wherein the second ending of the body (3) has a circumferential stop (4), the circumferential stop (4) is oriented against the thickening (2) of the mouthpiece (1);

wherein the mouthpiece (1) slides inside the cavity of the body (3) towards the stop (4);

wherein the stop (4) has a touch surface on its circumference, whereby the touch surface is located inside and against the thickening (2) on the mouthpiece (1);

wherein an outer diameter of the thickening (2) is larger than an inner diameter of the stop (4); or a difference between the outer diameter of the thickening (2) and the inner diameter of the stop (4) is less than twice the thickness of a wall of the hose;

wherein the stop (4) has an inner conical surface (6) and the thickening (2) has an outer conical surface (5); the inner conical surface (6) and the outer conical surface (5) have a same orientation;

wherein when the hose is placed on the mouthpiece, and then moved into a position, the mouthpiece and the circumferential stop produces a self-locking joint; and wherein the stop (4) is connected with the body (3) by at least two draw rods.

* * * * *